US007103318B2

(12) United States Patent
Levinsohn

(10) Patent No.: US 7,103,318 B2
(45) Date of Patent: Sep. 5, 2006

(54) MICROPHONE ACCESSORY

(76) Inventor: Steven Mark Levinsohn, 204 Hyde Gate, 27 Ruth Road, Hyde Park (ZA) 2196

( * ) Notice: Subject to any disclaimer, the term of this patent is extended or adjusted under 35 U.S.C. 154(b) by 15 days.

(21) Appl. No.: 10/792,729

(22) Filed: Mar. 5, 2004

(65) Prior Publication Data

US 2004/0198225 A1 Oct. 7, 2004

(30) Foreign Application Priority Data

Apr. 4, 2003 (ZA) ................................ 2003/2641

(51) Int. Cl.
*H04B 7/00* (2006.01)
*H04N 7/15* (2006.01)
*H04M 11/00* (2006.01)

(52) U.S. Cl. ................. 455/66.1; 455/90.3; 455/575.1; 455/556.1; 455/41.2; 455/569.1; 348/15

(58) Field of Classification Search ............ 348/14–20, 348/373–375; 455/66.1, 67.7, 67.11, 90.3, 455/575.1, 575.4, 575.6, 575.8, 90.2, 566–567, 455/569.1, 41.2, 557; 434/307 A, 307 R
See application file for complete search history.

(56) References Cited

U.S. PATENT DOCUMENTS

| | | | | |
|---|---|---|---|---|
| 5,323,257 | A * | 6/1994 | Abe et al. | 398/129 |
| 5,732,144 | A * | 3/1998 | Patino et al. | 381/91 |
| 5,808,663 | A * | 9/1998 | Okaya | 348/14.1 |
| 6,520,776 | B1 * | 2/2003 | Furukawa | 434/307 A |
| 6,548,987 | B1 * | 4/2003 | Oster et al. | 320/114 |
| 2003/0224732 | A1 * | 12/2003 | Suzuki et al. | 455/66.1 |
| 2004/0106091 | A1 * | 6/2004 | Weiner et al. | 434/236 |

* cited by examiner

*Primary Examiner*—Pablo N. Tran

(57) ABSTRACT

An accessory for use with a microphone has an electronic screen by means of which communications such as advertisements, messages, logos, the name of a TV station and the like may be displayed. The accessory may be attachable to the microphone itself, or to a boom, a stand or a stalk for the microphone. In one form the accessory may comprise a foam cover for the microphone. The communications may be transmitted to the accessory in a wireless or wired manner. The communication may be changed manually, remotely or in a predetermined automatic manner.

26 Claims, 3 Drawing Sheets

MICROPHONE ACCESSORY

BACKGROUND OF THE INVENTION

THIS INVENTION relates to an accessory for use with a microphone, to a microphone together with the accessory and to a method of using a microphone. More particularly it relates to an accessory for use with microphones that are used for audio pickup by television stations or networks and other broadcasters.

Television stations place identifiers on the microphones that their reporters use to gather audio from a subject, usually from a person that is being interviewed. These identifiers are usually made from plastic and are four-sided or triangular in shape. The station's name or logo is displayed on the identifier so that when the interview is broadcast, the audience can see that the station that is broadcasting the interview was present at the interview.

In addition, stations compete for viewers and need to keep their station brand and their channel number or broadcast frequency in the memory of viewers.

These known identifiers can only display a fixed message.

BRIEF SUMMARY OF THE INVENTION

According to the invention there is provided an accessory for use with a microphone, which includes a body having a plurality of planar faces, a display screen on at least one face for displaying an electronically variable communication, and an attaching formation in the form of a central passage through the body.

Further according to the invention there is provided a method of using a microphone, characterized therein that it includes displaying a variable communication by means of an accessory that includes a body having a plurality of planar faces, a display screen on at least one face for displaying an electronically variable communication, and an attaching formation in the form of a central passage through the body.

The communication may be a message, an advertisement, a logo, a station name, or the like. It will be understood that a particular communication may be a combination of different forms. For example, it could be a combination of an advertisement and a station identifier.

The display device may conveniently comprise an electronically operable display screen which may preferably be substantially planar. The accessory may have a plurality of faces, with a display screen on each face. A driver may be provided for each display screen, such that the same communication may be displayed on all the screens, or different communications may be displayed on different screens.

The accessory may further include a storage module in which the various communications to be displayed may be stored.

The accessory may also include a power supply. This may be a rechargeable battery.

The accessory may still further include a transfer unit whereby a communication may be transferred thereto, from a remote source, for display by the display device. This may be effected in a wired or wireless manner. Thus, in a preferred embodiment the transfer unit may include a wireless receiver for receiving a transmitted communication.

The accessory may, in addition, have a transmitter, which may also be wireless, for transmitting data such as the date, time, duration and identity, of advertisements displayed on the or each display device or for transmitting a control signal.

The accessory may, in addition, have a controller, a clock and a timer. Thus, the various communications may be displayed on selected display screens at designated times for predetermined durations.

It will be appreciated by those skilled in the art that the attaching formation will usually attach the accessory to the microphone, or it could attach the accessory to a stand therefor.

The invention extends to a microphone which has an accessory as described attached thereto.

The invention is now described by way of example with reference to the accompanying diagrammatic drawings.

DETAILED DESCRIPTION OF THE INVENTION

Figure 1:
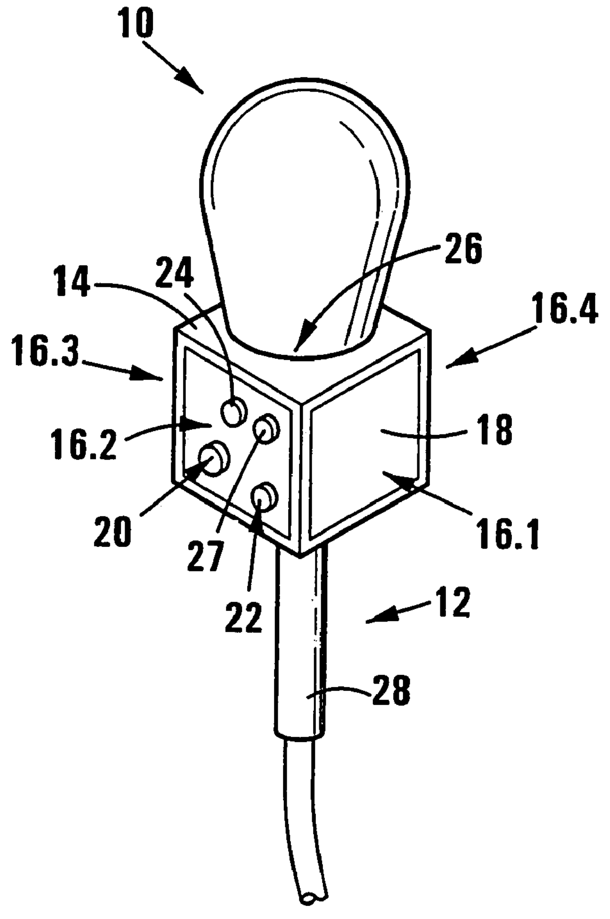
FIG. 1 shows a microphone with a first embodiment of an accessory in accordance with the invention attached thereto.

Referring now to FIG. 1, an accessory for use with a microphone is shown, the accessory being designated generally by reference numeral 10 and the microphone by reference numeral 12.

The accessory 10 has a cuboid body 14 which defines four planar faces 16.1 to 16.4. A display screen 18 is provided in the face 16.1. The display screen 18 is of a conventional type and may be of the LCD or plasma type. The screen 18 is supplied with signals from electronic circuitry (not shown) and power from a battery (also not shown) contained in the body 14. The electronic circuitry includes a storage module in which electronic signals to be displayed on the screen 18 are stored. The signals are supplied to the storage module by cable, using a socket 20. The battery is recharged via a socket 22. The screen 18 is switched ON and OFF by means of a switch 24.

The body 14 has an attaching formation in the form of a central passage 26 in which the stem 28 of the microphone 12 is received. As will be seen from FIG. 1, the passage 26 is a hollow opening that extends through the body 14 from top to bottom and which is open at both ends. In use the stem 28 of the microphone 12 is inserted into the passage 26 so that the body 14 is held frictionally on the stem 28 to be supported on the microphone 12. As will be appreciated from FIG. 4 and the description thereof hereinbelow, there is no electrical connection between the accessory 10 and the microphone 12. As has been explained above, any communication such as a message, advertisement, logo, station identifier, or the like may be displayed on the screen 18. The accessory 10 has a further button 27 by means of which the communication being displayed may be changed.

In use, a communication is transferred to the storage module and is displayed on the screen 18 when the microphone is used.

Figure 2:
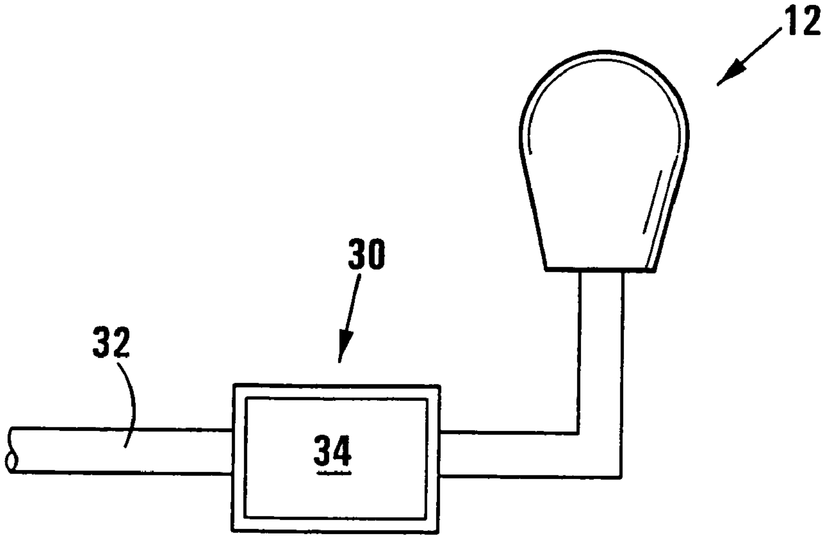
FIG. 2 shows a microphone stand with a second embodiment of an accessory in accordance with the invention attached thereto.

Referring now to FIG. 2, a further embodiment 30 of an accessory in accordance with the invention is shown. This embodiment 30 is more rectangular than the embodiment of FIG. 1 and is attached to an arm 32 of a stand or boom for the microphone 12. This embodiment 30 also has a screen 34.

Figure 3:
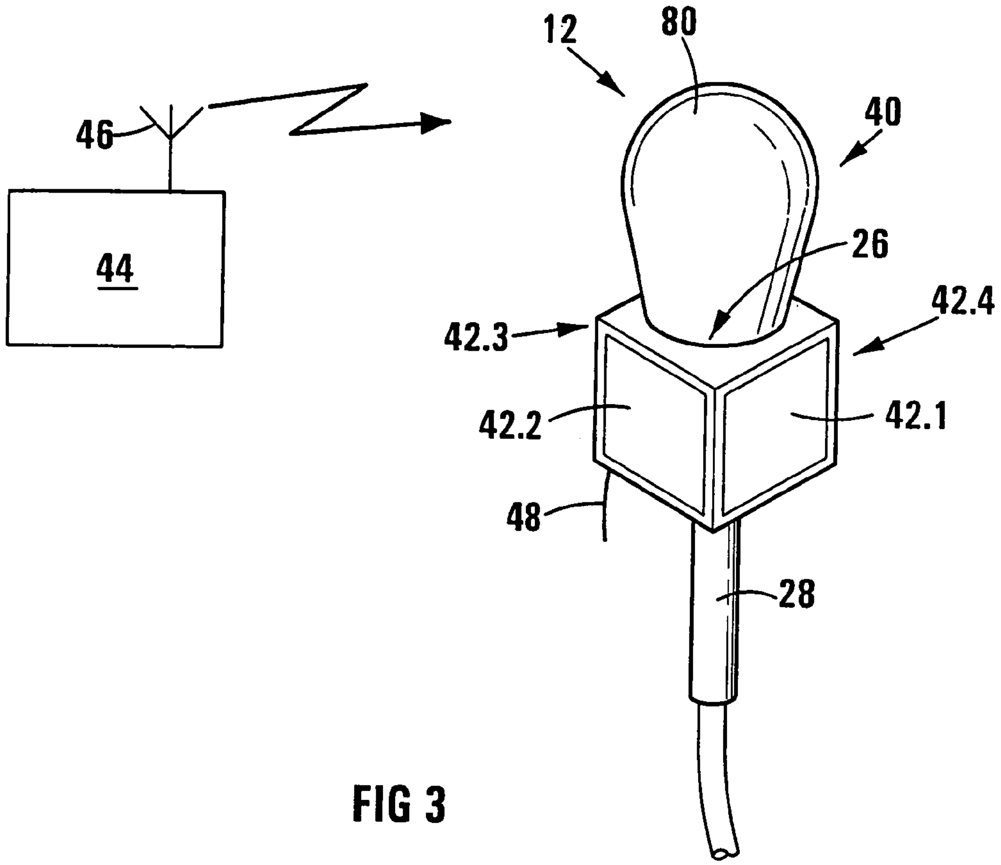
FIG. 3 shows a variation of the accessory of FIG. 1 together with a transmitter for transmitting signals to be displayed, to the accessory, in a wireless manner.

FIG. 3 is now referred to. In FIG. 3 a third embodiment 40 of an accessory in accordance with the invention is shown. This embodiment 40 is similar to the embodiment 10 of FIG. 1 and is similarly referenced. However, this embodiment 40 has four screens 42.1 to 42.4, there being a screen 42 on each face 16. Further, this embodiment 40 is supplied with signals to be displayed from a transmitter 44, in a wireless manner. Thus the transmitter 44 has an aerial 46 and the accessory has an aerial 48. Clearly, the accessory 40 has a receiver inside the body which receives the signals transmitted from the transmitter 44. With this embodiment, communications to be displayed on the screens 42 may be varied at will and may be changed or varied as required, depending on the bandwidth of the system. Further, as will be explained below, with reference to FIG. 4, a number of communications may be supplied to the accessory in advance and may then be displayed at predetermined times, for predetermined durations; or they may be displayed in a remotely controlled manner. Further, it will be appreciated that the same communication may be displayed at the same time on all four screens 42, or different communications may be displayed contemporaneously on the different screens. The accessory 40 also has a wireless transmitter by means of which data such as the time, date, duration and identity of advertisements displayed may be sent to an auditing or monitoring unit.

Figure 4:
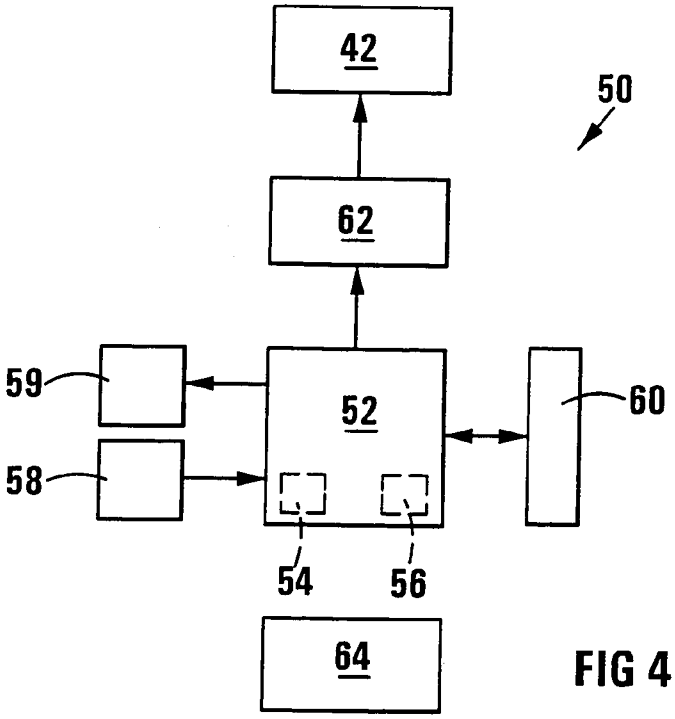
FIG. 4 shows a block diagram of the accessory of FIG. 3.

Referring now to FIG. 4, a block diagram of the electronic components of the accessory 40 is shown by reference numeral 50. Thus, the accessory has a computer based controller 52 which has a clock 54 and a timer 56, a receiver 58, a transmitter 59, a storage module 60, the display screens 42, drivers 62 for the screens 42 and a rechargeable battery 64. As explained above, the various communications are transmitted to the accessory 40, are received by the receiver 58 and stored in the storage module 60. Similarly, the controller 52 may be pre-programmed and control signals for programming the controller 52 are also transmitted, in advance, from the transmitter 44, received by the receiver 58 and stored in the storage module 60. The controller 52 then supplies the appropriate signals from the storage module 60 to the drivers 62 at the appropriate time (as determined by the clock 54) for the appropriate duration (as determined by the timer 56). If the manner in which communications are displayed is to be controlled remotely at the time the communications are to be displayed, then control signals may be supplied via a transmitter, which may be the same transmitter that supplied the communication signals or a different device, for immediate response by the controller 52. The controller 52 would then not require the clock 54 and timer 56. Further, depending on the bandwidth of the system and the size of the communications, the communications could be transmitted when they are to be displayed, and not in advance, such that the size of the storage module may be decreased or even dispensed with. The communication and control signals may both be received by the same receiver, or by different receivers. Further, as explained above, the date, time, duration and identity of the advertisements displayed are sent by the transmitter 59 to the auditing unit (not shown).

Figure 5:
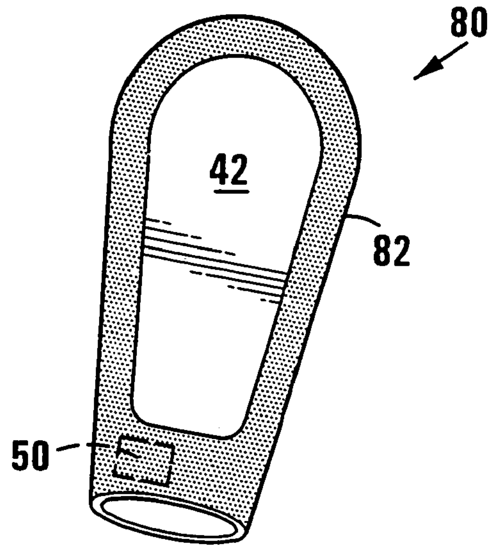
FIG. 5 shows a further embodiment of an accessory in accordance with the invention.

Referring now to FIG. 5, a third embodiment of an accessory in accordance with the invention is designated by reference numeral 80. It comprises a foam microphone cover 82, which is engageable over a microphone, a screen 42, and the electronic componentry 50.

Figure 6:
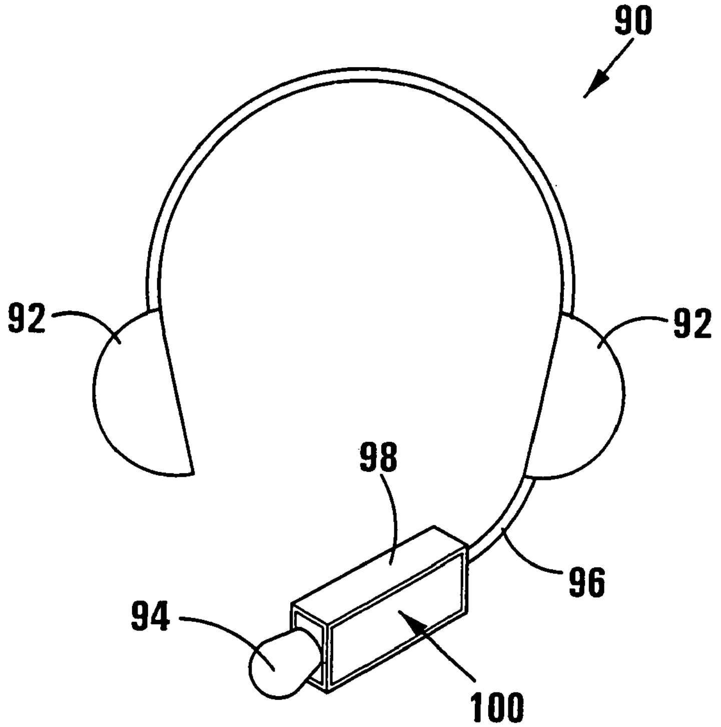
FIG. 6 shows a still further embodiment of an accessory in accordance with the invention, used with a headset microphone.

In FIG. 6, a conventional headset 90 is shown, which has earphones 92, a microphone 94 on a stalk 96, and an accessory 98, which has a screen 100.

While a description of the preferred embodiments of the present invention has been given, further modifications and alterations will occur to those skilled in the art. It is therefore understood that all such modifications and alterations be considered as within the scope of the invention as defined by the appended claims.

The invention claimed is:

1. An accessory for use with a microphone, characterized therein that it includes a body having a plurality of planar faces, a display screen on at least one face for displaying an electronically variable communication, and an attaching formation in the form of a central passage through the body, the central passage being a hollow opening that extends through the body such that the microphone is receivable therein with no electrical connection between the accessory and the mircophone.

2. The accessory as claimed in claim 1, characterized therein that the body is cuboid and has four planar faces.

3. The accessory as claimed in claim 2, characterized therein that it has a display screen on each face.

4. The accessory as claimed in claim 2, characterized therein that it has a display screen on three of the faces and control members on a fourth face.

5. The accessory as claimed in claim 1, characterized therein that the accessory includes a button by means of which a communication being displayed may be changed.

6. The accessory as claimed in claim 1, characterized therein that each display screen is substantially planar.

7. The accessory as claimed in claim 1, characterized therein that it includes a storage module in which a communication to be displayed may be stored.

8. The accessory as claimed in claim 1, characterized therein that it includes a driver for the display screen(s).

9. The accessory as claimed in claim 1, characterized therein that it includes a power supply.

10. The accessory as claimed in claim 1, characterized therein that it includes a transfer unit whereby a communication may be transferred thereto for display by the display screen.

11. The accessory as claimed in claim 10, characterized therein that the transfer unit includes a wireless receiver for receiving a transmitted communication.

12. The accessory as claimed in claim 10, characterized therein that it includes a socket for connection to a cable for receiving a transmitted communication.

13. The accessory as claimed in claim 1, characterized therein that it includes a transmitter for transmitting data to a remote device.

14. The accessory as claimed in claim 1, characterized therein that it includes a controller that is remotely operable.

15. The accessory as claimed in claim 1, characterized therein that it has a clock.

16. The accessory as claimed in claim 1, characterized therein that it includes a timer.

17. The accessory as claimed in claim 1, characterized therein that the display screen is substantially parallel to the central passage.

18. The accessory as claimed in claim 1, for use with a microphone of a broadcaster.

19. A method of using a microphone, characterized therein that it includes displaying a variable communication by means of an accessory that includes a body having a plurality of planar faces, a display screen on at least one face for displaying an electronically variable communication, and an attaching formation in the form of a central passage through the body, the central passage being a hollow opening that extends through the body, with the microphone being therein with no electrical connection between the accessory and the microphone.

20. A method of using a microphone as claimed in claim 19, characterized therein that the accessory has a storage module in which a communication to be displayed may be stored and the method includes storing the communication in advance in the storage module.

21. A method of using a microphone as claimed in claim 19, in which the communication is transferred to the accessory by means of a cable.

22. A method of using a microphone as claimed in claim 19, in which the communication is transferred to the accessory in a wireless manner.

23. The method as claimed in claim 19, characterized therein that the communication is displayed on receipt of a control signal from a remote device.

24. The method as claimed in claim 19, characterized therein that the communication is displayed by operating a control button.

25. The method as claimed in claim 19, characterized therein that the communication is displayed at a predetermined time for a predetermined duration.

26. The method as claimed in claim 19, characterized therein that the communication is transmitted to a receiver in the accessory from a remote source when it is to be displayed.

* * * * *